March 10, 1953   M. H. ARMS ET AL   2,631,067
CARRIAGE MOUNTING
Filed Nov. 21, 1947   2 SHEETS—SHEET 1
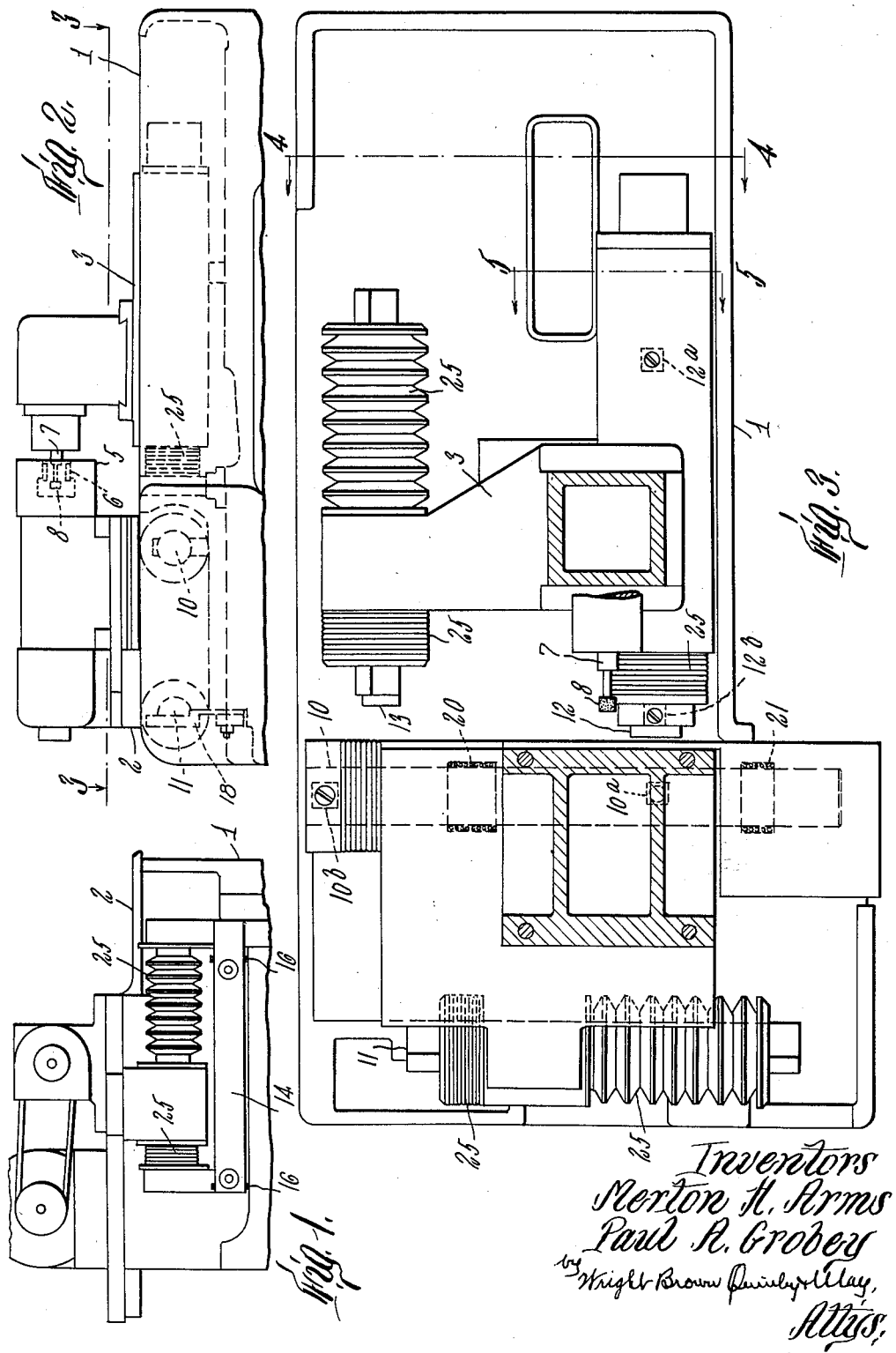
Inventors
Merton H. Arms
Paul A. Grobey
by Wright Brown Quinby & May
Attys.

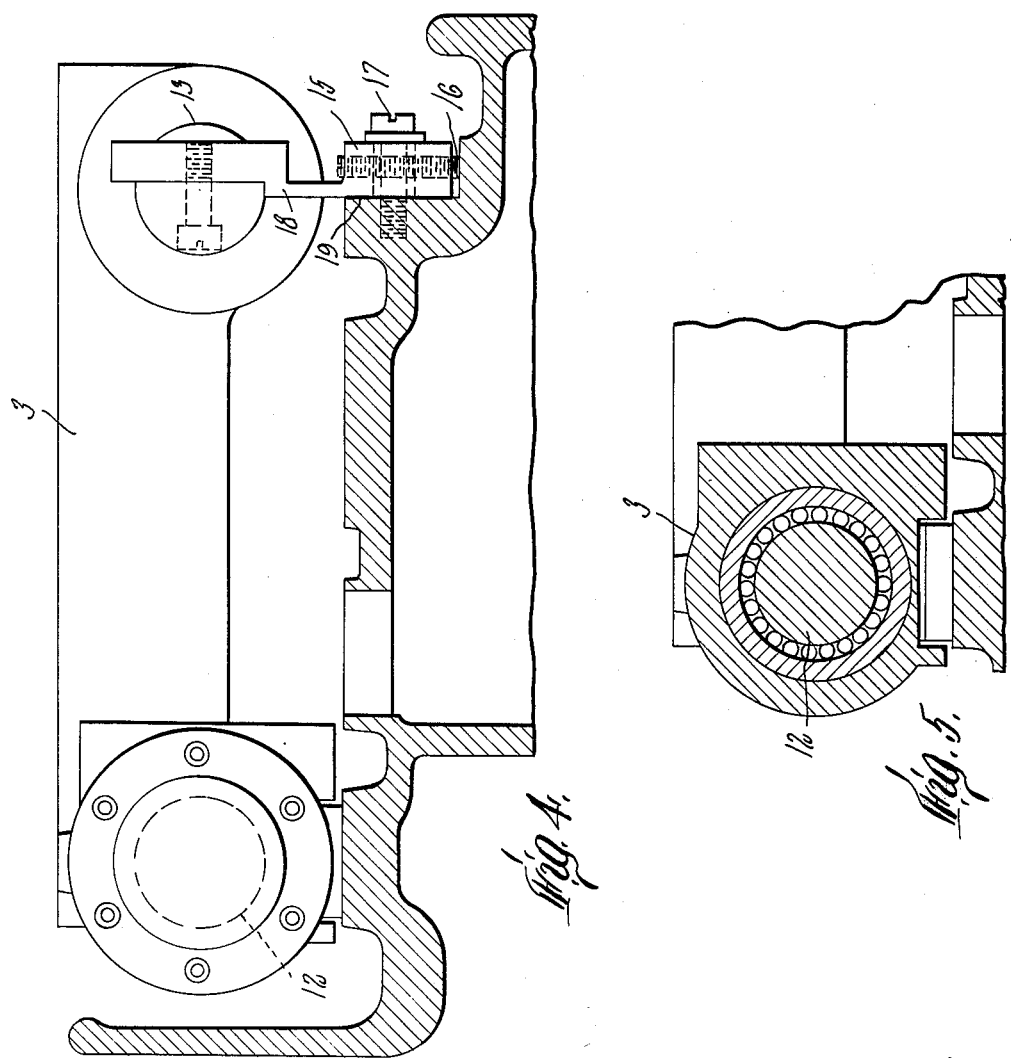

Patented Mar. 10, 1953

2,631,067

UNITED STATES PATENT OFFICE 2,631,067

CARRIAGE MOUNTING

Merton H. Arms and Paul A. Grobey, Springfield, Vt., assignors to Bryant Chucking Grinder Company, Springfield, Vt., a corporation of Vermont Application November 21, 1947, Serial No. 787,448

7 Claims. (Cl. 308—3)

This invention relates to the mounting of carriages for reciprocation, such carriages, for example, being work or tool carriages, and it has for an object to provide an improved mounting by which accurate control and alinement of the parts is readily obtained.

A further object is to provide a carriage mounting relatively insensitive to temperature changes and variations in temperature between various machine parts.

This application is a division of our application Serial No. 721,052, filed January 9, 1947, for Grinding Machines, now Patent Number 2,520,267.

For a complete understanding of this invention, reference may be had to the accompanying drawings in which:

Figures 1 and 2 are fragmentary left end and front elevational views, respectively, of the upper portion of a grinding machine embodying the invention.

Figure 3 is a horizontal sectional view on line 3—3 of Figure 2.

Figures 4 and 5 are detail vertical sectional views on lines 4—4 and 5—5, respectively, of Figure 3.

As shown best in Figures 1 and 2, this machine includes a bed 1 on which is mounted a pair of carriages 2 and 3, the carriage 2 being arranged to support a work spindle carrying a work supporting chuck 5 for a work piece 6, and the carriage 3 being a tool carriage and as shown supporting a grinding wheel spindle 7 which carries on its projecting end a grinding wheel 8.

Each carriage is supported on a pair of cylindrical guide bars 10 and 11 for the work carriage and 12 and 13 for the tool carriage. One of each of these guide bars is rigidly carried by the bed 1, the guide bar 10 for the work carriage and the guide bar 12 for the tool carriage being so shown. The guide bars 11 and 13 are supported from a pair of carrier bars 14 and 15, respectively. Each of these carrier bars is supported at opposite ends on vertically adjustable jack screws 16 (see Figure 4 for carrier bar 13 support), and may be secured in vertically adjusted position as by screws 17 passing through vertical slots in the respective carrier bars and threaded into the bed 1. By this means the carrier bars may be adjusted vertically and independently at each end. These carrier bars are arranged to support at spaced points, reeds 18 which are rigidly secured at their upper ends to the guide bars 11 or 13. The carrier bars engage with vertical faces 19 on the bed 1 and the planes of flexure of the reeds are perpendicular to the planes of the guide bars of the corresponding set, each set comprising a pair of guide bars 10, 11, and 12, 13. The reeds as shown are in the planes of the central axes of the respective bars which avoids any rolling effect of the bars as the reeds flex.

The carriages 2 and 3 are supported on the guide bars 10 and 11 and 12 and 13, respectively, on three sets of preloaded ball bearings, two sets of these bearings engaging one of the guide bars at spaced points therealong, and the other single set engaging the other guide bar of the pair. As shown, for example, two of these ball bearings at 20 and 21 are engaged with the fixed guide bar 10 and a single such ball bearing engages the bar 11. Similarly for the tool slide, two spaced sets of such bearings are mounted on the bar 12, while a single set of such bearings is mounted on the bar 13. By this mounting the carriages may be moved freely along the guide bars and with maximum smoothness. The guide bars 10 and 12 which are provided with the pair of spaced ball bearings are each provided with one support from the bed 1 located between these bearings as at 10a and 12a and a support 10b and 12b outwardly of one of these bearings. When the two carriages 2 and 3 are in grinding positions, the ball bearings for each are close to these supports of both bars, thus giving the most rigid support to the carriages for the grinding operation, and avoiding flexure of the supporting bars which might otherwise occur. By reason of the reed mounting of one of the guide bars for each carriage and the independent vertical adjustment of each end of this guide bar transverse to the general plane of these guide bars, the guide bars of each pair may be adjusted into exact coplanar relation, and any variations due to temperature changes or to unequal temperature changes of various portions of the machine are taken up automatically by the flexing of the reeds. This mounting arrangement makes it easy to adjust the planes of motion of the two carriages in the desired precise relationships and to so maintain them during operations of the machine, and despite warping changes which may occur through seasoning of the bed and through temperature changes and variations of temperatures of different portions of the bed 1. In order to protect the bearings on the guide bars from access by foreign materials, these bars may be surrounded by flexible bellows 25 which seal off these guide bars from their ends to the guided portions of the respective carriages.

Suitable mechanism for reciprocating the carriages, for example, as shown in the parent application will be used, but as they form no part of the present invention, they are not shown or described herein.

From the foregoing description of an embodiment of this invention, it will be evident to those skilled in the art that various changes and modifications might be made without departing from the spirit or scope of the invention.

We claim:

1. In combination, a support, a pair of substantially parallel guide bars, one of said guide bars being rigidly carried by said support, a member carrying the other of said guide bars, said member including a flexible part between said support and said other guide bar yielding from and toward said one guide bar, and a carriage supported for motion along said guide bars.

2. In combination, a support, a pair of substantially parallel guide bars, one of said guide bars being rigidly carried by said support, flexible reeds carrying the other of said guide bars from said support for yielding from and toward said one guide bar, and a carriage supported for motion along said guide bars.

3. In combination, a support, a pair of substantially parallel guide bars, one of said guide bars being rigidly carried by said support, means carrying the other of said guide bars for yielding from and toward said one guide bar, means for adjusting one of said guide bars angularly transverse to the direction of yield of said other bar and to the general plane of the axes of said guide bars to adjust said guide bars in exact coplanar relation, and a carriage supported for motion along said guide bars.

4. In combination, a support, a pair of substantially parallel guide bars, one of said guide bars being rigidly carried by said support, flexible reeds carrying the other of said guide bars from said support for yielding from and toward said one guide bar, means for adjusting said reeds transverse to their flexing directions, and a carriage supported for motion along said guide bars.

5. In combination, a support, a pair of substantially parallel guide bars, one of said guide bars being rigidly carried by said support, flexible reeds carrying the other of said guide bars from said support for yielding from and toward said one guide bar, said reeds lying substantially in a plane with the central axis of said other guide bar, and a carriage supported for motion along said guide bars.

6. In combination, a support, a pair of substantially parallel guide bars, one of said bars being rigidly carried by said support, a carrier bar arranged substantially parallel to the other of said guide bars, reeds having flexing directions transverse to the length of said other guide bar securing said other guide bar to said carrier bar, means for independently adjusting opposite end portions of said carrier bar transverse to the general plane of the axes of said guide bars to adjust said other guide bar into exact coplanar relation with said one guide bar, and a carriage supported for motion along said guide bars.

7. In combination, a support, a pair of substantially parallel guide bars, one of said bars being rigidly carried by said support, a carrier bar arranged substantially parallel to the other of said guide bars, reeds having flexing directions transverse to the length of said other guide bar securing said other guide bar to said carrier bar, means for independently adjusting opposite end portions of said carrier bar transverse to the general plane of the axes of said guide bars to adjust said other guide bar into exact coplanar relation with said one guide bar, a carriage having a pair of bearing portions spaced lengthwise of one of said guide bars and a single bearing portion for the other of said guide bars, and preloaded ball bearings interposed between said bearing portions and their respective bars.

MERTON H. ARMS.
PAUL A. GROBEY.

REFERENCES CITED

The following references are of record in the file of this patent:

UNITED STATES PATENTS

| Number | Name | Date |
|---|---|---|
| 1,154,155 | Yeomans | Sept. 21, 1915 |
| 1,811,508 | Klages | June 23, 1931 |
| 2,220,068 | Eckardt | Nov. 5, 1940 |
| 2,293,134 | Hallenbeck | Aug. 18, 1942 |
| 2,422,774 | Conner | June 24, 1947 |